US012562649B2

(12) United States Patent
Ma et al.

(10) Patent No.: US 12,562,649 B2
(45) Date of Patent: Feb. 24, 2026

(54) FLYBACK POWER CONVERTER AND CONTROL METHOD THEREOF

(71) Applicant: Delta Electronics (Shanghai) Co., Ltd., Shanghai (CN)

(72) Inventors: Kehua Ma, Shanghai (CN); Haitao Zhang, Shanghai (CN); Daofei Xu, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 153 days.

(21) Appl. No.: 18/430,436

(22) Filed: Feb. 1, 2024

(65) Prior Publication Data

US 2024/0266964 A1 Aug. 8, 2024

(30) Foreign Application Priority Data

Feb. 8, 2023 (CN) .......................... 202310098910.7

(51) Int. Cl.
H02M 3/335 (2006.01)
H02M 1/34 (2007.01)

(52) U.S. Cl.
CPC ... H02M 3/33507 (2013.01); H02M 3/33576 (2013.01); *H02M 1/342* (2021.05)

(58) Field of Classification Search
CPC ............. H02M 1/342; H02M 3/33507; H02M 3/33576
See application file for complete search history.

(56) References Cited

U.S. PATENT DOCUMENTS

| | | | |
|---|---|---|---|
| 10,103,616 B1 | 10/2018 | Lin et al. | |
| 2014/0185333 A1* | 7/2014 | Yang ................. | H02M 3/33569 |
| | | | 363/21.12 |
| 2015/0131341 A1* | 5/2015 | Koo .................. | H02M 3/33569 |
| | | | 363/21.13 |
| 2017/0176919 A1* | 6/2017 | Asano .................... | G03G 15/80 |
| 2018/0062529 A1* | 3/2018 | Song ................. | H02M 3/33569 |
| 2019/0013739 A1* | 1/2019 | Hari .................. | H02M 3/33569 |
| 2019/0356232 A1 | 11/2019 | Song et al. | |
| 2021/0313897 A1 | 10/2021 | Zhou et al. | |

FOREIGN PATENT DOCUMENTS

| | | |
|---|---|---|
| CN | 110677045 B | 9/2020 |
| CN | 113410994 A | 9/2021 |
| CN | 112003476 B | 2/2022 |

* cited by examiner

*Primary Examiner* — Jue Zhang
(74) *Attorney, Agent, or Firm* — KIRTON McCONKIE; Evan R. Witt

(57) ABSTRACT

A flyback power converter includes a transformer, a voltage clamping circuit, a main switch element and a control circuit. The voltage clamping circuit includes a first capacitor and a clamping switch element. The first capacitor is electrically connected with a primary winding of the transformer. The clamping switch element is electrically connected between the capacitor and the primary winding. The control circuit detects a capacitor voltage of the first capacitor and a current flowing through the clamping switch element. If the capacitor voltage is greater than a reference voltage, the clamping switch element is turned on. If the capacitor voltage is not greater than the reference voltage and the current flowing through the clamping switch element is lower than a reference current value, the clamping switch element is turned off.

16 Claims, 4 Drawing Sheets

1

FLYBACK POWER CONVERTER AND CONTROL METHOD THEREOF

CROSS-REFERENCE TO RELATED APPLICATION

This application claims priority to China Patent Application No. 202310098910.7, filed on Feb. 8, 2023, the entire contents of which are incorporated herein by reference for all purposes.

FIELD OF THE INVENTION

The present disclosure relates to a power converter, and more particularly to a flyback power converter and a control method of the flyback power converter.

BACKGROUND OF THE INVENTION

Generally, due to the simple control mechanism and low cost, flyback power converters have been widely used in low-power power supply products.

Due to the leakage inductance of the internal transformer in the flyback power converter, the switch element in the flyback power converter has a high voltage stress when it is turned off. In order to overcome this problem, the existing flyback power converter usually uses an RCD clamping circuit with a resistor, a capacitor and a clamping diode to absorb leakage inductance energy to suppress the voltage stress. However, the RCD clamping circuit also consumes the leakage inductance energy. Especially, most of the energy loss occurs in the reverse recovery process of the clamping diode of the RCD clamping circuit.

In order to suppress the voltage stress and recover the leakage inductance energy, some existing flyback power converters use an active clamp flyback (ACF) control method to achieve higher efficiency and lower voltage stress. However, this control method is complicated, and there is a risk of isolation failure between the primary and secondary sides of the transformer. In addition, the efficiency of recovering the leakage inductance energy is low.

Therefore, there is a need of providing an improved flyback power converter and an improved control method in order to overcome the drawbacks of the conventional technologies.

SUMMARY OF THE INVENTION

The present disclosure provides a flyback power converter and a control method for the flyback power converter. The circuitry topology of the flyback power converter is specially designed. The diode used in the RCD clamping circuit is replaced by a clamping switch element of the flyback power converter. The on/off states of the clamping switch element in the voltage clamping circuit are controlled according to the capacitor voltage of a first capacitor and the current flowing through the clamping switch element. If the capacitor voltage of the first capacitor is greater than a reference voltage, the clamping switch element is turned on. If the current flowing through the clamping switch element is lower than the reference current value and the capacitor voltage of the first capacitor is lower than the reference voltage, the clamping switch element is turned off. Since the reverse recovery process of the diode does not occur, the reverse recovery loss of the diode is reduced. When compared with the flyback power converter using the active clamp flyback (ACF) control method, the control method of the flyback power converter is simplified. In addition, the risk of isolation failure between the primary and secondary sides of the transformer is avoided. In case that the voltage stress does not exceed the allowable voltage stress, the magnitude of the reference voltage may be set as a higher value. Since the working frequency of the voltage clamping circuit is reduced, the efficiency of the flyback power converter is enhanced.

In accordance with an aspect of present disclosure, a control method for a flyback power converter is provided. The control method includes the following steps. In a step (a), the flyback power converter is provided. The flyback power converter includes a transformer, a voltage clamping circuit, a main switch element and a control circuit. The voltage clamping circuit includes a first capacitor and a clamping switch element. A first terminal of the first capacitor is electrically connected with a first terminal of a primary winding of the transformer. A first terminal of the clamping switch element is electrically connected with a second terminal of the primary winding. A second terminal of the clamping switch element is electrically connected with a second terminal of the first capacitor. A first terminal of the main switch element and the first terminal of the clamping switch element are electrically connected with the second terminal of the primary winding. In a step (b), the control circuit detects a capacitor voltage between the second terminal and the first terminal of the first capacitor and detect a current flowing through the clamping switch element. The first terminal of the first capacitor is a negative terminal. The second terminal of the first capacitor is a positive terminal. A direction of the current flowing from the first terminal of the clamping switch element to the second terminal of the clamping switch element is defined as a forward direction. In a step (c), the control circuit determines whether the capacitor voltage is greater than a reference voltage. When the capacitor voltage is greater than the reference voltage, the clamping switch element is turned on, and then a step (d) is conducted. Whereas, when the capacitor voltage is not greater than the reference voltage, the control method returns to conduct the step (b) again. In a step (d), the control circuit determines whether the capacitor voltage is lower than or equal to the reference voltage. When the capacitor voltage is lower than or equal to the reference voltage, a step (e) is conducted. Whereas, when the capacitor voltage is greater than the reference voltage, the step (d) is conducted again. In the step (e), the control circuit determines whether the current flowing through the clamping switch element is lower than a reference current value. When the current flowing through the clamping switch element is lower than the reference current value, a step (f) is conducted. Whereas, when the current flowing through the clamping switch element is not lower than the reference current value, the control method returns to conduct the step (d) again. In the step (f), the clamping switch element is turned off under control of the control circuit.

In accordance with another aspect of present disclosure, a flyback power converter is provided. The flyback power converter includes a transformer, a main switch element, a voltage clamping circuit and a control circuit. The transformer includes a primary winding and a secondary winding. A first terminal of the main switch element is electrically connected with a second terminal of the primary winding. The voltage clamping circuit includes a first capacitor and a clamping switch element. A first terminal of the first capacitor is electrically connected with a first terminal of the primary winding. A first terminal of the clamping switch element is electrically connected with the second terminal of the primary winding. A second terminal of the clamping switch element is electrically connected with a second terminal of the first capacitor. The control circuit detects a capacitor voltage of the first capacitor and a current flowing through the clamping switch element. When the capacitor voltage is greater than a reference voltage, the clamping switch element is turned on under control of the control circuit. After the clamping switch element is turned on, when the capacitor voltage is lower than or equal to the reference voltage and the current flowing through the clamping switch element is lower than a reference current value, the clamping switch element is turned off under control of the control circuit.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
FIG. 1 is a schematic circuit diagram illustrating the circuitry topology of a flyback power converter according to a first embodiment of the present disclosure.
Figure 2:
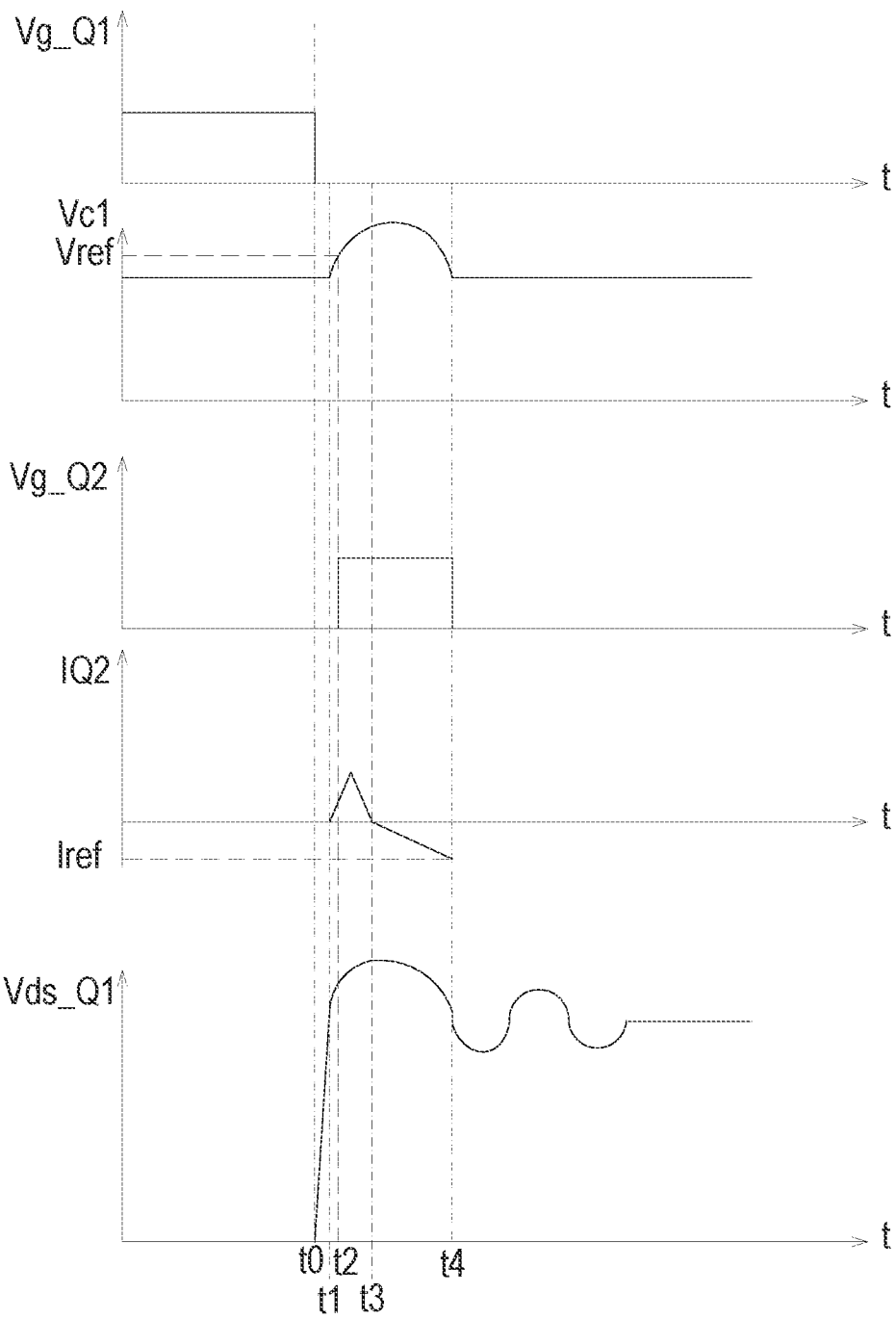
FIG. 2 is a schematic timing waveform diagram illustrating associated signals of the flyback power converter as shown in FIG. 1.

Please refer to FIGS. 1 and 2. FIG. 1 is a schematic circuit diagram illustrating the circuitry topology of a flyback power converter according to a first embodiment of the present disclosure. FIG. 2 is a schematic timing waveform diagram illustrating associated signals of the flyback power converter as shown in FIG. 1. The flyback power converter 1 receives an AC input voltage Vin. By the flyback power converter 1, the AC input voltage Vin is converted into a DC output voltage Vo. In an embodiment, the flyback power converter 1 includes a transformer T, a voltage clamping circuit 2, a main switch element Q1 and a control circuit 3.

The voltage clamping circuit 2 includes a first capacitor C1 and a clamping switch element Q2. The first capacitor C1 includes a first terminal and a second terminal. The clamping switch element Q2 includes a first terminal, a second terminal and a control terminal. The second terminal of the clamping switch element Q2 is electrically connected with the second terminal of the first capacitor C1.

The transformer T includes a primary winding Np and a secondary winding Ns, which are magnetically coupled with each other. The primary winding Np includes a first terminal and a second terminal. The first terminal of the primary winding Np is electrically connected with the first terminal of the first capacitor C1. The second terminal of the primary winding Np is electrically connected with the first terminal of the clamping switch element Q2.

The main switch element Q1 includes a control terminal, a first terminal and a second terminal. The first terminal of the main switch element Q1 is electrically connected with the first terminal of the clamping switch element Q2 and the second terminal of primary winding Np. The second terminal of the main switch element Q1 is connected to the ground terminal. The control terminal of the main switch element Q1 is electrically connected with a main controller (not shown). The on/off states of the main switch element Q1 are controlled by the main controller.

The first terminal of the first capacitor C1, the second terminal of the first capacitor C1, the control terminal of the clamping switch element Q2 and the first terminal of the clamping switch element Q2 are electrically connected with the control circuit 3. A reference voltage Vref and a reference current value Iref are previously stored in the control circuit 3. There is a capacitor voltage Vc1 between the second terminal and the first terminal of the first capacitor C1. The control circuit 3 receives the capacitor voltage Vc1. Moreover, the voltage of the first capacitor C1 at the second terminal is greater than the voltage of the first capacitor C1 at the first terminal. That is, the first terminal of the first capacitor C1 is a negative terminal, and the second terminal of the first capacitor C1 is a positive terminal. In addition, the value of the capacitor voltage Vc1 is not negative. The control circuit 3 further receives the current flowing through the clamping switch element Q2. The direction of the current flowing from the first terminal of the clamping switch element Q2 to the second terminal of the clamping switch element Q2 is defined as a forward direction (i.e., a positive direction).

It is noted that the method of detecting the current value of the current flowing through the clamping switch element Q2 is not restricted. For example, a Hall current sensor or a sampling resistor may be used to detect the current value. Alternatively, the current value may be detected according to the voltage drop of the clamping switch element Q2. The current flowing through the clamping switch element Q2 is denoted as IQ2. The current IQ2 is obtained according to the voltage from the first terminal to the second terminal of the clamping switch element Q2.

The control circuit 3 compares the capacitor voltage Vc1 with the reference voltage Vref. According to the comparing result, the on state of the clamping switch element Q2 is correspondingly controlled. Moreover, the control circuit 3 compares the current IQ2 with the reference current value Iref. According to the comparing result, the off state of the clamping switch element Q2 is correspondingly controlled.

In an embodiment, the main switch element Q1 and the clamping switch element Q2 are N-type MOSFET transistors. In each of the main switch element Q1 and the clamping switch element Q2, the control terminal is the gate terminal, the first terminal is the drain terminal, and the second terminal is the source terminal. Moreover, the gate-source charge (Qgs) of the clamping switch element Q2 is lower than 10 nC, and the reverse recovery time of the body diode is lower than 100 ns.

In an embodiment, the flyback power converter 1 further includes a rectifying circuit 5, an input capacitor Cin and a secondary circuit 6. The rectifying circuit 5 receives and rectifies the input voltage Vin. The first terminal of the input capacitor Cin is electrically connected with the rectifying circuit 5 (or a first input terminal) and the first terminal of the transformer T. The second terminal of the input capacitor Cin is connected with the ground terminal (or a second input terminal). The input capacitor Cin is used for voltage stabilization. The secondary circuit 6 is electrically connected with the secondary winding Ns of the transformer T. The electric power from the secondary winding Ns is converted by the secondary circuit 6. Consequently, the output voltage Vo is generated and outputted from the flyback power converter 1. In an embodiment, the secondary circuit 6 includes a third switch element Q3 and an output capacitor Co. The third switch element Q3 is electrically connected between the first terminal of the secondary winding Ns and the first terminal of the output capacitor Co. The second terminal of the output capacitor Co is connected with the ground terminal. The first terminal and the second terminal of the output capacitor Co are formed as the output terminal of the flyback power converter 1 to output the output voltage Vo.

Hereinafter, the operations of the flyback power converter 1 will be described with reference to FIGS. 1 and 2. In the time interval between the time point t0 and the time point t1, the driving voltage Vg_Q1 provided to the control terminal of the main switch element Q1 is switched from a high-level state to a low-level state. Consequently, the main switch element Q1 is switched from the on state to the off state. Moreover, the drain-source voltage Vds_Q1 between the first terminal and the second terminal of the main switch element Q1 is gradually increased. Meanwhile, the capacitor voltage Vc1 is lower than the reference voltage Vref. Consequently, the driving voltage Vg_Q2 provided to the control terminal of the clamping switch element Q2 is in the low-level state under control of the control circuit 3. In addition, the clamping switch Q2 is in the off state. Moreover, at the time point t1, the condition of turning on the body diode of the clamping switch element Q2 is satisfied.

In the time interval between time point t1 and the time point t2, the capacitor value Vc1 is still lower than the reference voltage Vref. Consequently, the clamping switch element Q2 is turned off. Meanwhile, the leakage inductance energy of the transformer T is transferred through the body diode of the clamping switch element Q2 and recycled to the first capacitor C1 to charge the first capacitor C1. At the time point t2, the capacitor voltage Vc1 is equal to the reference voltage Vref. Meanwhile, the driving voltage Vg_Q2 provided to the control terminal of the clamping switch element Q2 is switched from the low-level state to the high-level state. Consequently, the clamping switch element Q2 is switched from the off state to the on state.

In the time interval between the time point t2 and the time point t3, the current IQ2 flows in the direction from the first terminal of the clamping switch element Q2 to the second terminal of the clamping switch element Q2. That is, the current IQ2 flows in the forward direction. Meanwhile, the first capacitor C1 is charged by the leakage inductance energy from the transformer T. At the time point t3, the current IQ2 flowing through the clamping switch element Q2 is zero, and the capacitor voltage Vc1 of the capacitor C1 reaches the maximum value. Since the capacitor voltage Vc1 is greater than the reference voltage Vref, the clamping switch element Q2 is still turned on under control of the control circuit 3.

In the time interval between the time point t3 and the time point t4, the current IQ2 flows in the direction from the second terminal of the clamping switch element Q2 to the first terminal of the clamping switch element Q2. That is, the current IQ2 flows through the clamping switch element Q2 in a reverse direction (or a negative direction). The value of the current IQ2 received by the control circuit 3 is negative.

Meanwhile, the stored energy in the first capacitor C1 is discharged through the channel region of the second switch element Q2. Consequently, the capacitor voltage Vc1 is gradually decreased. In addition, the energy is transferred to the secondary side of the transformer T. That is, the stored energy discharged from the first capacitor C1 is transferred to the leakage inductor of the transformer T and the output terminal of the flyback power converter 1.

At the time point t4, the capacitor voltage Vc1 is lower than the reference voltage Vref, and the current IQ2 received by the clamping switch element Q2 is equal to the reference current value Iref. Meanwhile, the clamping switch element Q2 is switched from the on state to the off state under control of the control circuit 3. Since the energy in the first capacitor C1 is discharged through the clamping switch element Q2, no reverse recovery process of the diode occurs. Since the reverse recovery process of the diode does not occur, the reverse recovery loss of the diode is reduced, and the efficiency of the flyback power converter 1 is enhanced. In addition, a greater portion of the leakage inductance is recycled. When compared with the flyback power converter using the active clamp flyback (ACF) control method, the control method of the flyback power converter 1 is simplified and the control mechanism is more cost-effective. In addition, the risk of isolation failure between the primary and secondary sides of the transformer T is avoided when the clamping switch element Q2 is turned on once only.

Furthermore, in case that the voltage stress of the main switch element Q1 does not exceed the allowable voltage stress, the magnitude of the reference voltage Vref may be set as a higher value. In other words, after plural switching cycles of the main switch element Q1, the clamping switch circuit Q2 enters the switching state. Consequently, the working frequency of the voltage clamping circuit 2 is reduced, and the efficiency of recovering the leakage inductance energy recovery is enhanced. The associated principle will be described with reference to FIG. 4.

Figure 4:
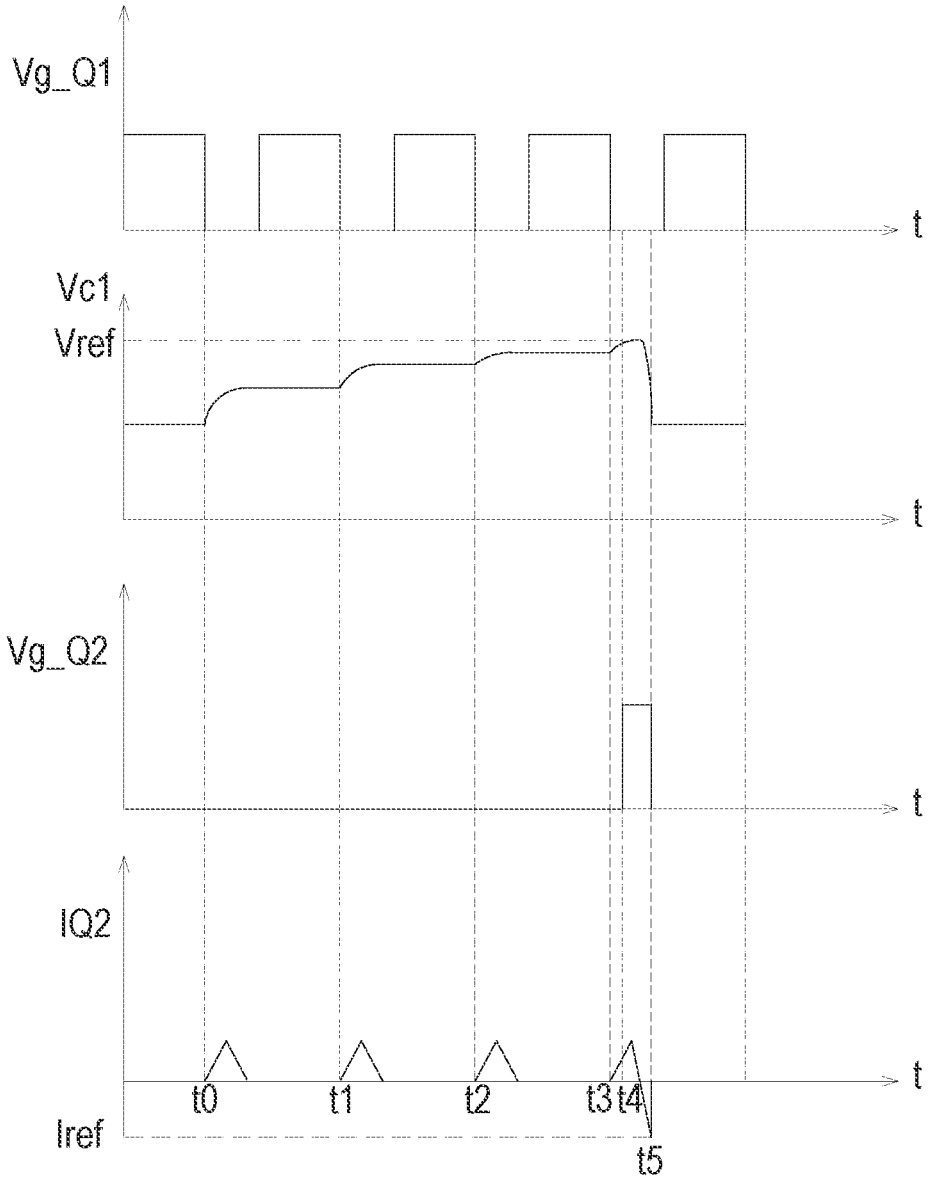
FIG. 4 is a schematic timing waveform diagram illustrating associated signals of the flyback power converter as shown in FIG. 1, in which the reference voltage is set at a higher value.

FIG. 4 is a schematic timing waveform diagram illustrating associated signals of the flyback power converter as shown in FIG. 1, in which the reference voltage is set at a higher value.

The time interval between the time point t0 and the time point t1 is a switching cycle. In the switching cycle, the capacitor voltage Vc1 is lower than the reference voltage Vref. Under this circumstance, the clamping switch element Q2 is maintained in the off state, and the leakage inductance energy is transferred through the body diode of the clamping switch element Q2 and stored in the first capacitor C1. In the switching cycle between the time point t1 and the time point t2 and the switching cycle between the time point t2 and the time point t3, the capacitor voltage Vc1 is also lower than the reference voltage Vref, and the clamping switch element Q2 is maintained in the off state.

At the time point t4, the capacitor voltage Vc1 reaches the reference voltage Vref. Consequently, under control of the control circuit 3, the clamping switch element Q2 is turned on. At the time point t5, the capacitor voltage Vc1 is lower than the reference voltage Vref, and the current IQ2 flowing through the clamping switch element Q2 reaches the reference current value Iref. Meanwhile, the clamping switch element Q2 is turned off under control of the control circuit 3. Consequently, the capacitor voltage Vc1 is restored to the initial value corresponding to the time point t0.

In an embodiment, the voltage specifications of the main switch element Q1 and the clamping switch element Q2 are identical. The on-resistance of the main switch element Q1 is at the mohm level, and the on-resistance of the clamping switch element Q2 is at the ohm level. Consequently, the switching speed of the clamping switch element Q2 is faster, and the conduction time of the body diode of the clamping switch element Q2 is reduced. Especially, the reference voltage Vref is greater than the product of the transformation ratio of the transformer T and the output voltage Vo of the flyback power converter 1. In addition, the reference voltage Vref is less than 1.5 times the product of the transformation ratio of the transformer T and the output voltage Vo of the flyback power converter 1. The input voltage Vin of the flyback power converter 1 is AC current, and the input voltage Vin is in the range between 90 Vac and 264 Vac.

The transformation ratio of the transformer T is 6:1, the leakage inductance of the transformer T is 5.4 uH, the working frequency is 60 kHZ, the output voltage Vo is 20V, and the capacitance of the first capacitor C1 is 1~4.7 nF. The reference voltage Vref is set as Vo×(the turn ratio of the transformer T)×(1~1.5). For example, the reference voltage Vref is set as 140V. The reference current value Iref is set as zero or a negative value. For example, the reference current value Iref is set according to the voltage drop of the clamping switch element Q2 when the current flowing through the on-state clamping switch element Q2 is −1 A. It is noted that the above parameters are not restricted. That is, the parameters of the flyback power converter 1 may be varied according to the practical requirements.

In an embodiment, the control circuit 3 is an IC chip with five pins. The five pins include a first pin P1, a second pin P2, a third pin P3, a fourth pin P4 and a fifth pin P5. The first pin P1 is electrically connected with the first terminal of the first capacitor C1. The second pin P2 is electrically connected with the second terminal of the first capacitor C1. The third pin P3 is electrically connected with the control terminal of the clamping switch element Q2. The fourth pin P4 is electrically connected with the first terminal of the clamping switch element Q2. The voltages from the first terminal and the second terminal of the first capacitor C1 are respectively received by the first pin P1 and the second pin P2. The fourth pin P4 and the second pin P2 are used to detect the current IQ2 flowing through the clamping switch element Q2. By detecting the voltage drop across the clamping switch element Q2, the purpose of detecting the current signal can be achieved.

In an embodiment, the flyback power converter 1 further includes a bootstrap circuit 4. The bootstrap circuit 4 is electrically connected with the fourth pin P4 and the fifth pin P5 of the control circuit 3 to provide electric power to the control circuit 3. The bootstrap circuit 4 includes a diode D and a bootstrap capacitor C2. The anode of the diode D is electrically connected with a voltage source VCC. The cathode of the diode D is electrically connected with the first terminal of the bootstrap capacitor C2 and the fifth pin P5 of the control circuit 3. The second terminal of the bootstrap capacitor C2 is electrically connected with the first pin P1 of the control circuit 3 and the first terminal of the main switch element Q1. When the first switch element Q1 is turned on, the fourth pin P4 is connected to the ground terminal, and the voltage source VCC is transmitted through the diode D to charge the fifth pin P5 of the control circuit 3. When the first switch element Q1 is turned off, the stored energy in the fifth pin P5 of the control circuit 3 provides a driving signal to the clamping switch element Q2.

Figure 3:
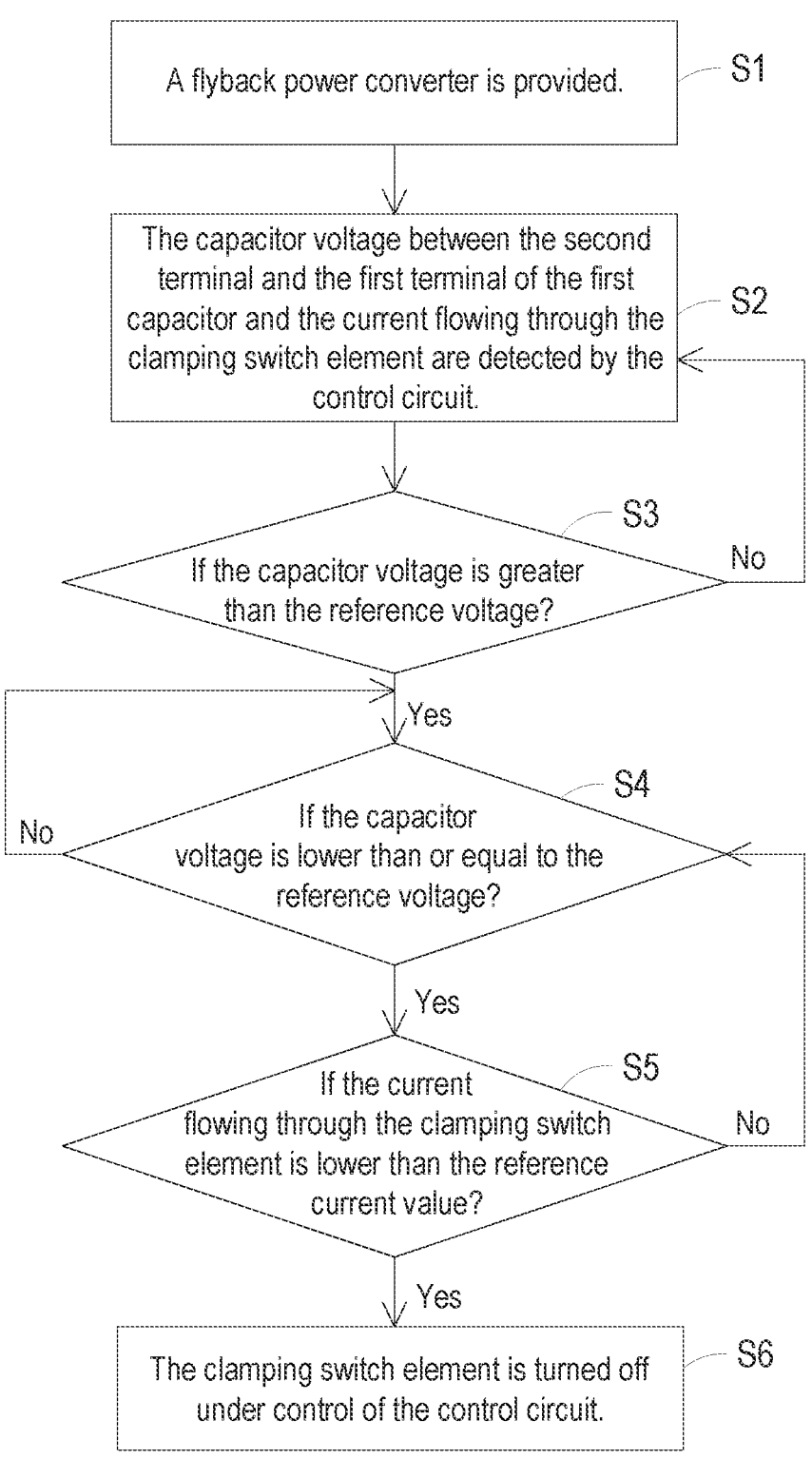
FIG. 3 is a flowchart illustrating a control method for the flyback power converter according to an embodiment of the present disclosure.

Please refer to FIGS. 1, 2, 3 and 4. FIG. 3 is a flowchart illustrating a control method for the flyback power converter according to an embodiment of the present disclosure. The control method is applied to the flyback power converter 1 as shown in FIG. 1. As shown in FIG. 3, the control method includes the following steps.

In a step S1, the flyback power converter 1 as shown in FIG. 1 is provided.

In a step S2, the capacitor voltage Vc1 between the second terminal and the first terminal of the first capacitor C1 and the current IQ2 flowing through the clamping switch element Q2 are detected by the control circuit 3.

In a step S3, the control circuit 3 receives the capacitor voltage Vc1. The first terminal of the first capacitor C1 is the negative terminal. The second terminal of the first capacitor C1 is the positive terminal. The capacitor voltage Vc1 is not negative. Moreover, the control circuit 3 determines whether the capacitor voltage Vc1 is greater than the reference voltage Vref. If the determining result of the step S3 is satisfied, a step S4 is conducted. Whereas, if the determining result of the step S3 is not satisfied, the control method returns to conduct the step S2 again.

In the step S4, the clamping switch element Q2 is turned on under control of the control circuit 3. In addition, the control circuit 3 determines whether the capacitor voltage Vc1 is lower than or equal to the reference voltage Vref. If the determining result of the step S4 is satisfied, a step S5 is conducted. Whereas, if the determining result of the step S4 is not satisfied, the step S4 is conducted again.

In the step S5, the control circuit 3 determines whether the current IQ2 is lower than the reference current value Iref. If the determining result of the step S5 is satisfied, a step S6 is conducted. Whereas, if the determining result of the step S5 is not satisfied, the control method returns to conduct the step S4 again.

In the step S6, the clamping switch element Q2 is turned off under control of the control circuit 3.

From the above descriptions, the present disclosure provides a flyback power converter and a control method for the flyback power converter. The diode used in the RCD clamping circuit is replaced by the clamping switch element of the flyback power converter. The on/off states of the clamping switch element in the voltage clamping circuit are controlled according to the capacitor voltage of the first capacitor and the current flowing through the clamping switch element. Since the reverse recovery process of the diode does not occur, the reverse recovery loss of the diode is reduced, and the efficiency of the flyback power converter is enhanced. When compared with the flyback power converter using the active clamp flyback (ACF) control method, the control method of the flyback power converter is simplified. In addition, the risk of isolation failure between the primary and secondary sides of the transformer is avoided.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A control method for a flyback power converter, the control method comprising steps of:
    (a) providing the flyback power converter, wherein the flyback power converter comprises a transformer, a voltage clamping circuit, a main switch element and a control circuit, the voltage clamping circuit comprises a first capacitor and a clamping switch element, a first terminal of the first capacitor is electrically connected with a first terminal of a primary winding of the transformer, a first terminal of the clamping switch element is electrically connected with a second terminal of the primary winding, a second terminal of the clamping switch element is electrically connected with a second terminal of the first capacitor, and a first terminal of the main switch element and the first terminal of the clamping switch element are electrically connected with the second terminal of the primary winding;

(b) the control circuit detecting a capacitor voltage between the second terminal and the first terminal of the first capacitor and detecting a current flowing through the clamping switch element, wherein the first terminal of the first capacitor is a negative terminal, the second terminal of the first capacitor is a positive terminal, and a direction of the current flowing from the first terminal of the clamping switch element to the second terminal of the clamping switch element is defined as a forward direction;

(c) the control circuit determining whether the capacitor voltage is greater than a reference voltage, wherein when the capacitor voltage is greater than the reference voltage, the clamping switch element is turned on, and then a step (d) is conducted, wherein when the capacitor voltage is not greater than the reference voltage, the control method returns to conduct the step (b) again;

(d) the control circuit determining whether the capacitor voltage is lower than or equal to the reference voltage, wherein when the capacitor voltage is lower than or equal to the reference voltage, a step (e) is conducted, wherein when the capacitor voltage is greater than the reference voltage, the step (d) is conducted again;

(e) the control circuit determining whether the current flowing through the clamping switch element is lower than a reference current value, wherein when the current flowing through the clamping switch element is lower than the reference current value, a step (f) is conducted, wherein when the current flowing through the clamping switch element is not lower than the reference current value, the control method returns to conduct the step (d) again; and (f) turning off the clamping switch element under control of the control circuit.

2. The control method according to claim 1, wherein the reference voltage is greater than a product of a transformation ratio of the transformer and an output voltage of the flyback power converter, and the reference voltage is less than 1.5 times the product of the transformation ratio of the transformer and the output voltage of the flyback power converter.

3. The control method according to claim 1, wherein the reference current value is zero or a negative value.

4. The control method according to claim 1, wherein the control circuit is an IC chip.

5. The control method according to claim 1, wherein the control circuit comprises a first pin, a second pin, a third pin and a fourth pin, wherein the first pin is electrically connected with the first terminal of the first capacitor, the second pin is electrically connected with the second terminal of the first capacitor and the second terminal of the clamping switch element, the third pin is electrically connected with a control terminal of the clamping switch element, and the fourth pin is electrically connected with the first terminal of the clamping switch element.

6. The control method according to claim 5, wherein the flyback power converter further comprises a bootstrap circuit, wherein the bootstrap circuit comprises a diode and a bootstrap capacitor, an anode of the diode is electrically connected with a voltage source, and a cathode of the diode is electrically connected with the bootstrap capacitor in series.

7. The control method according to claim 1, wherein a gate-source charge (Qgs) of the clamping switch element is lower than 10 nC.

8. The control method according to claim 1, wherein the reverse recovery time of a body diode of the clamping switch element is lower than 100 ns.

9. A flyback power converter, comprising:

a transformer comprising a primary winding and a secondary winding;

a main switch element comprising a first terminal, a second terminal and a control terminal, wherein the first terminal of the main switch element is electrically connected with a second terminal of the primary winding;

a voltage clamping circuit comprising a first capacitor and a clamping switch element, wherein a first terminal of the first capacitor is electrically connected with a first terminal of the primary winding, a first terminal of the clamping switch element is electrically connected with the second terminal of the primary winding, and a second terminal of the clamping switch element is electrically connected with a second terminal of the first capacitor; and a control circuit detecting a capacitor voltage of the first capacitor and a current flowing through the clamping switch element, wherein when the capacitor voltage is greater than a reference voltage, the clamping switch element is turned on under control of the control circuit, wherein after the clamping switch element is turned on, when the capacitor voltage is lower than or equal to the reference voltage and the current flowing through the clamping switch element is lower than a reference current value, the clamping switch element is turned off under control of the control circuit.

10. The flyback power converter according to claim 9, wherein the reference voltage is greater than a product of a transformation ratio of the transformer and an output voltage of the flyback power converter, and the reference voltage is less than 1.5 times the product of the transformation ratio of the transformer and the output voltage of the flyback power converter.

11. The flyback power converter according to claim 9, wherein the reference current value is zero or a negative value.

12. The flyback power converter according to claim 9, wherein the control circuit is an IC chip.

13. The flyback power converter according to claim 9, wherein the control circuit comprises a first pin, a second pin, a third pin and a fourth pin, wherein the first pin is electrically connected with the first terminal of the first capacitor, the second pin is electrically connected with the second terminal of the first capacitor and the second terminal of the clamping switch element, the third pin is electrically connected with a control terminal of the clamping switch element, and the fourth pin is electrically connected with the first terminal of the clamping switch element.

14. The flyback power converter according to claim 13, wherein the flyback power converter further comprises a bootstrap circuit, wherein the bootstrap circuit comprises a diode and a bootstrap capacitor, an anode of the diode is electrically connected with a voltage source, and a cathode of the diode is electrically connected with the bootstrap capacitor in series.

15. The flyback power converter according to claim 9, wherein a gate-source charge (Qgs) of the clamping switch element is lower than 10 nC.

16. The flyback power converter according to claim 9, wherein the reverse recovery time of a body diode of the clamping switch element is lower than 100 ns.

\* \* \* \* \*